United States Patent [19]

Johansson

[11] 4,253,543

[45] Mar. 3, 1981

[54] DEVICE FOR ABSORPTION OF AIRBORNE SOUND

[75] Inventor: Bengt R. Johansson, Sollentuna, Sweden

[73] Assignee: Antiphon AB, Sundbyberg, Sweden

[21] Appl. No.: 3,860

[22] Filed: Jan. 16, 1979

Related U.S. Application Data

[63] Continuation of Ser. No. 832,477, Sep. 12, 1977, abandoned.

[30] Foreign Application Priority Data

Oct. 12, 1976 [SE] Sweden ................................ 7611288

[51] Int. Cl.[3] .......................... E04B 1/82; B32B 3/00; B32B 3/26

[52] U.S. Cl. .................................... 181/286; 181/291; 428/172; 428/195; 428/315; 428/317; 428/320

[58] Field of Search ............... 181/210, 290, 291, 292, 181/293, 294; 428/172, 195, 132, 138, 315, 317, 320

[56] References Cited

U.S. PATENT DOCUMENTS

| | | | |
|---|---|---|---|
| 3,035,657 | 5/1962 | Lemon | 181/293 X |
| 3,412,513 | 11/1968 | Gösele | 181/290 X |
| 3,444,956 | 5/1969 | Gaffney | 181/290 |
| 3,476,209 | 11/1969 | Cohen . | |
| 3,972,383 | 8/1976 | Green | 181/292 X |
| 4,076,100 | 2/1978 | Davis | 181/290 |
| 4,097,633 | 6/1978 | Focht | 181/290 X |
| 4,129,672 | 12/1978 | Momurg et al. | 428/138 |

FOREIGN PATENT DOCUMENTS

| | | | |
|---|---|---|---|
| 106399 | 1/1943 | Sweden . | |
| 202947 | 3/1966 | Sweden . | |
| 858049 | 1/1961 | United Kingdom | 181/290 |

*Primary Examiner*—William R. Dixon, Jr.
*Attorney, Agent, or Firm*—Stevens, Davis, Miller & Mosher

[57] ABSTRACT

Device for absorption of airborne sound, comprising a rigid, air permeable and self-supporting carrying layer having a flexible, air impermeable membrane applied thereto. The device is characterized in that the carrying layer has an air flow resistance of less than 10,000 Pas/m, that the layer has a thickness of 1–60 mm, preferably 5–20 mm, and that at least one surface of the layer is provided with a relief pattern. The device is further characterized in that a flexible membrane having a surface weight of less than 2 $kg/m^2$ is firmly attached to the carrying layer by gluing or the like. The membrane is resting on the upper parts of the relief pattern, whereby an air gap is obtained between the membrane and the lower parts of the relief pattern.

10 Claims, 9 Drawing Figures

FIG. 1
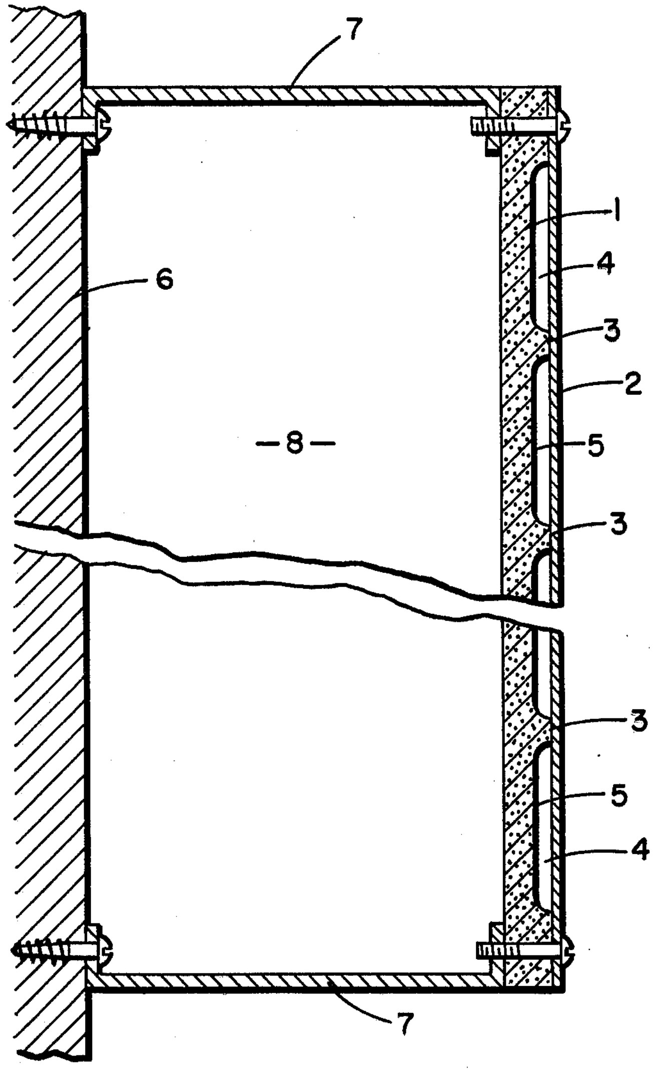
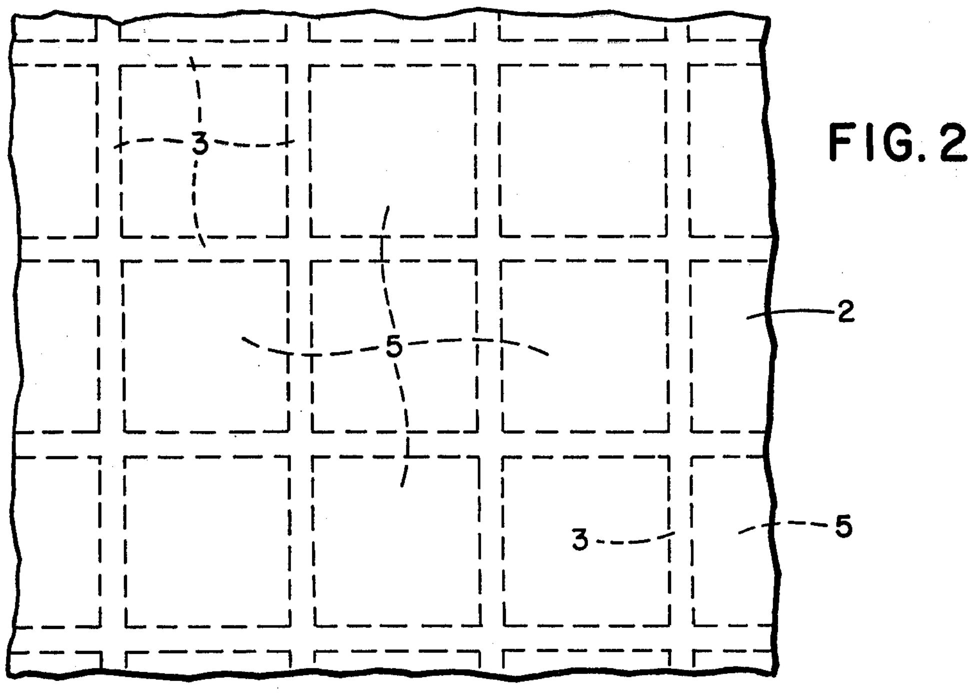
FIG. 2

EFFECT OF VARIOUS PERCENTAGES OF RELIEF PATTERN AREA SUPPORTING MEMBRANE 2

EFFECT OF DEPTH OF AIR GAP 4

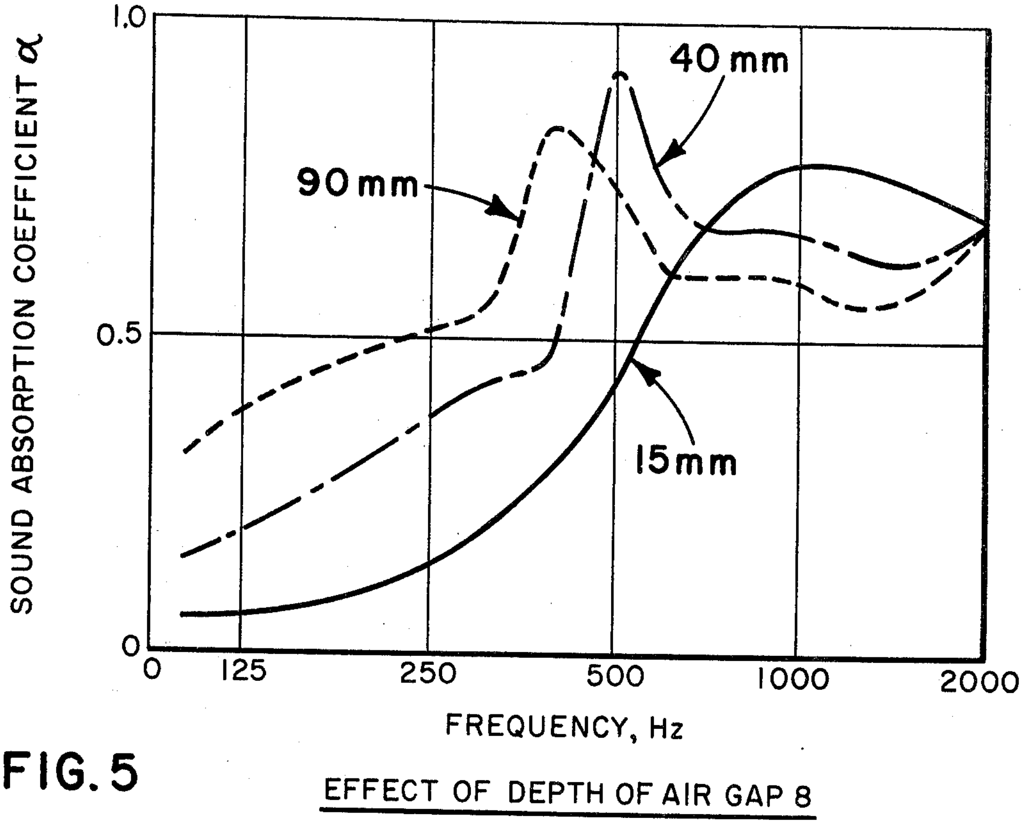
FIG. 5
EFFECT OF DEPTH OF AIR GAP 8
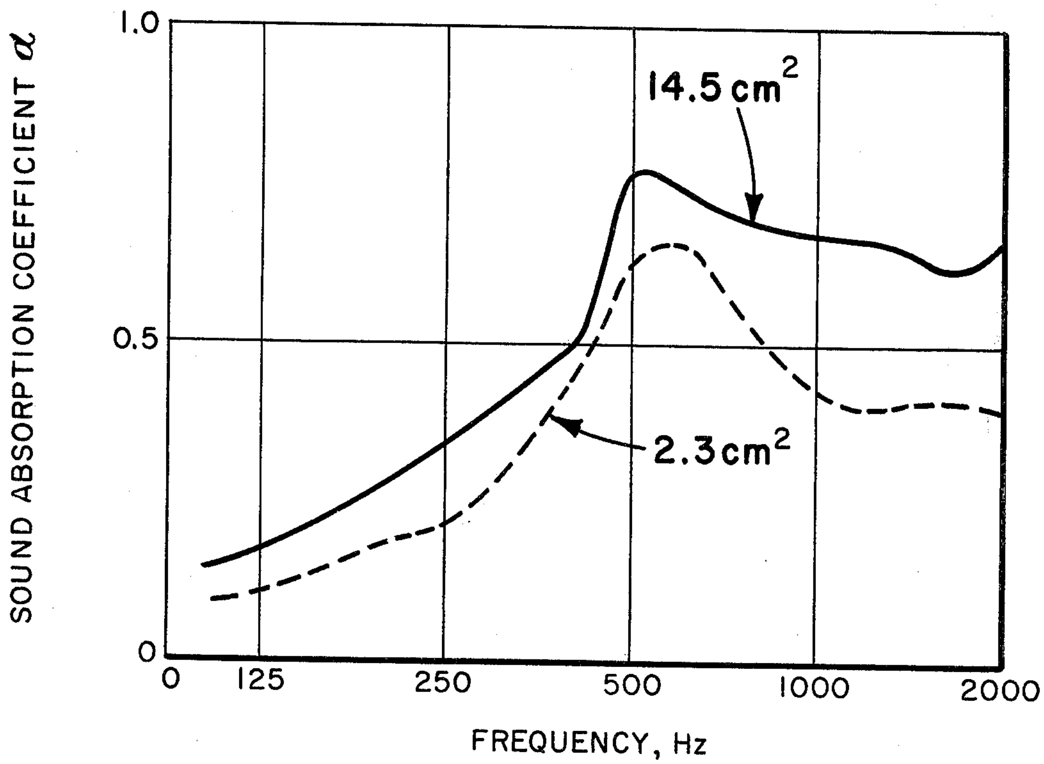
FIG. 6 EFFECT OF AREA OF FREE SURFACE OF MEMBRANE 2

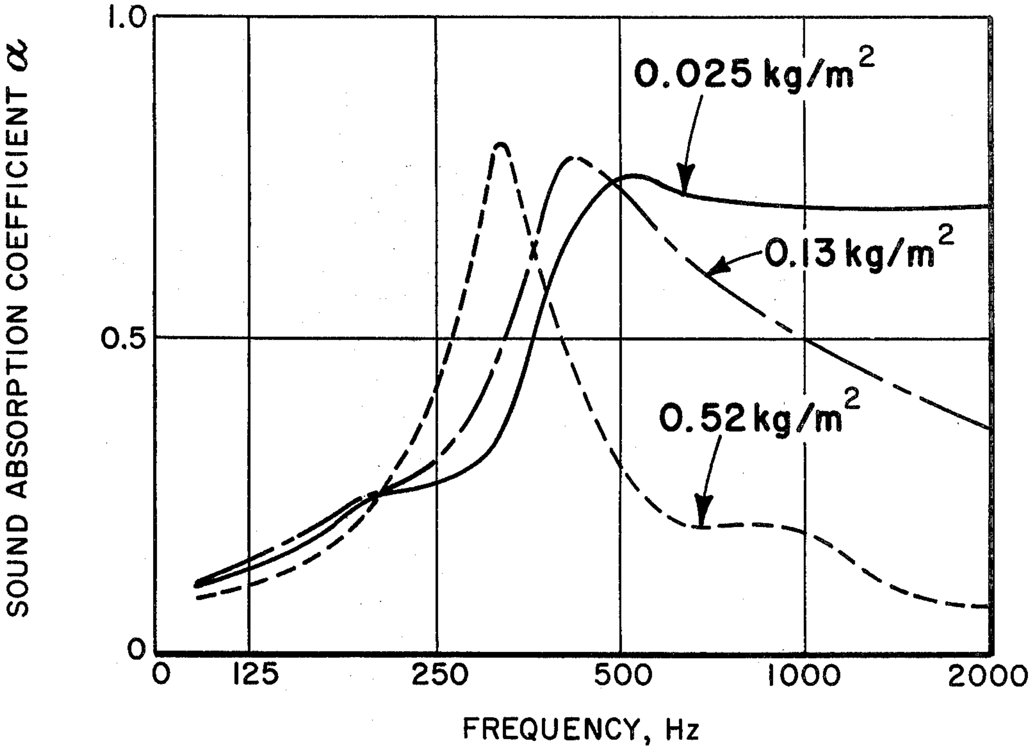
FIG. 7 EFFECT OF THE FREE SURFACE WEIGHT OF THE MEMBRANE 2
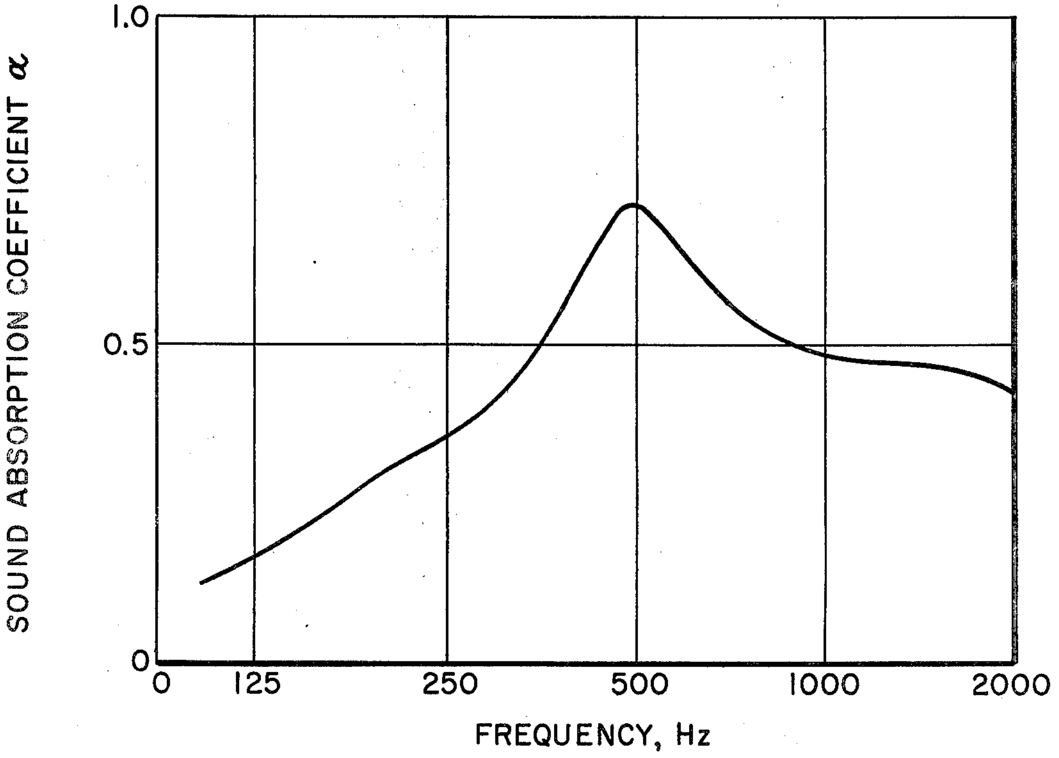
FIG. 8 SOUND ABSORPTION OF DEVICE ACCORDING TO EXAMPLE 2

SOUND ABSORPTION OF DEVICE ACCORDING TO EXAMPLE 3

DEVICE FOR ABSORPTION OF AIRBORNE SOUND

This is a continuation of application Ser. No. 832,477 filed Sept. 12, 1977 now abandoned.

The present invention relates to a device for absorption of airborne sound, comprising a rigid, air permeable and self-supporting carrying layer and a flexible, air impermeable membrane applied thereto.

The device is principally intended to be mounted inside the engine compartment of vehicles, preferably cars, by means of spacing supports. However, the device can also be used for absorption of airborne sound in connection with other objects, such as casings on or around machines.

A porous, flexible layer, consisting of mineral wool or plastic foam is often used as a device for absorption of airborne sound inside engine compartments and in casings of machines. In order to prevent fluids, such as oil and water, from penetrating into the porous layer and to make the device cleanable, a plastics foil is usually applied to the surface of the porous layer. In order to avoid any appreciable decrease of the sound absorbing properties, the plastics foil should be thin and lie loosely on the porous layer.

Because of the fact that the foil is thin and the porous layer is flexible, the device is sensitive to mechanical impacts. There is a great risk of breaking the foil. Therefore, it is common to protect the foil by mounting a perforated, sound permeable, rigid plate in front of it. In order not to get a too complicated installation, the perforated, rigid plate usually lies on the foil, which means that the foil cannot vibrate freely under the impact of sound waves. This results in a decrease of the sound absorbing qualities of the device. A device constructed in this way will also be expensive and require an extensive installation work.

Since the porous layers are flexible, they must be fixed to a sound reflecting wall situated behind. Then either gluing or relatively expensive, mechanical fasteners can be used. Gluing often results in a troublesome installation and in many cases the glues emit gases hazardous to health. Sometimes, for example a plastic foam provided with a self-adhering glue protected by paper is used. The protective paper is removed before the application of the device. This means a simpler way of mounting. However, the surface to which the device is to be fixed must be very well cleaned. The cleaning means an expensive operation.

In order to get a good sound absorption at low frequencies, the porous layer has to be rather thick, usually thicker than 50 mm. This results in a high material consumption, which contributes to the high costs for the device.

Attempts have been made to bring about a device where the above mentioned drawbacks, at least to a certain extent, are avoided. Such a device is described in the Swedish Pat. No. 202,947. However, said device is not provided with an impervious surface layer, which is required in most cases.

According to the present invention the above mentioned problems connected to previously known constructions have been solved and a device for absorption of airborne sound, including a rigid, air permeable and self-supporting carrying layer having a flexible air impermeable membrane applied thereto has been brought about. The device is characterized in that the carrying layer has an air flow resistance of less than 10000 Pas/m, that the layer has a thickness of 1–60 mm, preferably 5–20 mm, and that at least one surface of the layer is provided with a relief pattern. The device is further characterized in that a flexible membrane having a surface weight of less than 2 $kg/m^2$ is firmly attached to the carrying layer by gluing or the like in such a way that the membrane is resting on the upper parts of the relief pattern of the carrying layer, whereby an air gap is obtained between the flexible membrane and the lower parts of the relief pattern, and that the device is intended to be mounted at a distance from a sound reflecting surface, for instance by means of spacing supports, thereby obtaining an air gap between the back side of the carrying layer and the sound reflecting surface.

The carrying layer can for example be made of pressed, pulled rags, board of mineral wool, sintered plastic balls, sintered metal balls or rigid plastic foam, having mainly open cells. As the carrying layer is self-supporting the device can be mounted by a few mechanical fasteners.

As mentioned above, the carrying layer used according to the invention should have an air flow resistance of less than 10000 Pas/m, which gives good sound absorbing properties.

The relief pattern of the carrying layer can be obtained either by making recesses in any geometrical shape, such as squares, circles or triangles, in the carrying layer when manufacturing it or by applying one or more separate relief pattern forming layers on the surface of the carrying layer. The relief pattern forming layer can be made of the same material as the carrying layer or of another material. The depth of the relief pattern can be varied between 0.05 and 20 mm, preferably 0.5–5 mm, giving the air gap the same depth. In order to get good sound absorbing properties the highest parts of the relief pattern should occupy at most 80 percent of the total surface of the pattern. Due to the fact that the flexible membrane is fixed to the highest sections of the relief pattern the membrane is free to vibrate under the impact of sound waves, which is advantageous when sound absorbing properties are concerned.

The flexible membrane can, as mentioned above, be fixed to the carrying layer by gluing. The glue can be applied to all or some of the upper parts of the relief pattern of the carrying layer. The flexible membrane can be made of different materials but it should have a surface weight of less than 2 $kg/m^2$ in order to get sufficient sound absorbing properties. Moreover, for the same reason the size of the free surfaces of the membrane should not be less than 1 $cm^2$. In most cases, a plastic film is suitable as a flexible membrane. It can for example be made of polyurethane, polyethylene, polypropylene, polyester, polyamide, polycarbonate, polyvinylchloride, polyoxymethylene, polyvinylfluoride or a similar plastics material.

Since the carrying layer is rigid it also serves as a mechanical stop when the membrane is subjected to mechanical impacts. The device is thereby considerably more capable of resisting damage than a device consisting of a flexible porous layer with a membrane facing. This means that additional mechanical protection is unnecessary in most cases.

As mentioned above, the device is intended to be mounted in front of a sound reflecting surface and at a distance from said surface, which means that an air gap is formed between the back side of the carrying layer and the sound reflecting surface. In order to obtain such a distance between the device and the sound reflecting surface, spacing supports having a length between 5 and 100 mm are used. By varying the length of the spacing supports, the same device can be adapted to different frequency ranges of the sound. Furthermore, the device has got a low weight and the material consumption is little. In some cases the carrying layer and the spacing supports can be made in one piece.

The present invention will be explained more in detail in connection with the embodiment examples given below and the enclosed Figures of which FIG. 1 shows a fragmentary sectional view of one specific embodiment of the device according to the invention.

FIG. 2 shows a fragmentary elevational view of another cut out part of the same device as in FIG. 1.

FIGS. 3 to 7 show curves regarding the variation of the sound absorption factor $\alpha$ versus frequency when different variables are changed.

Figure 3:
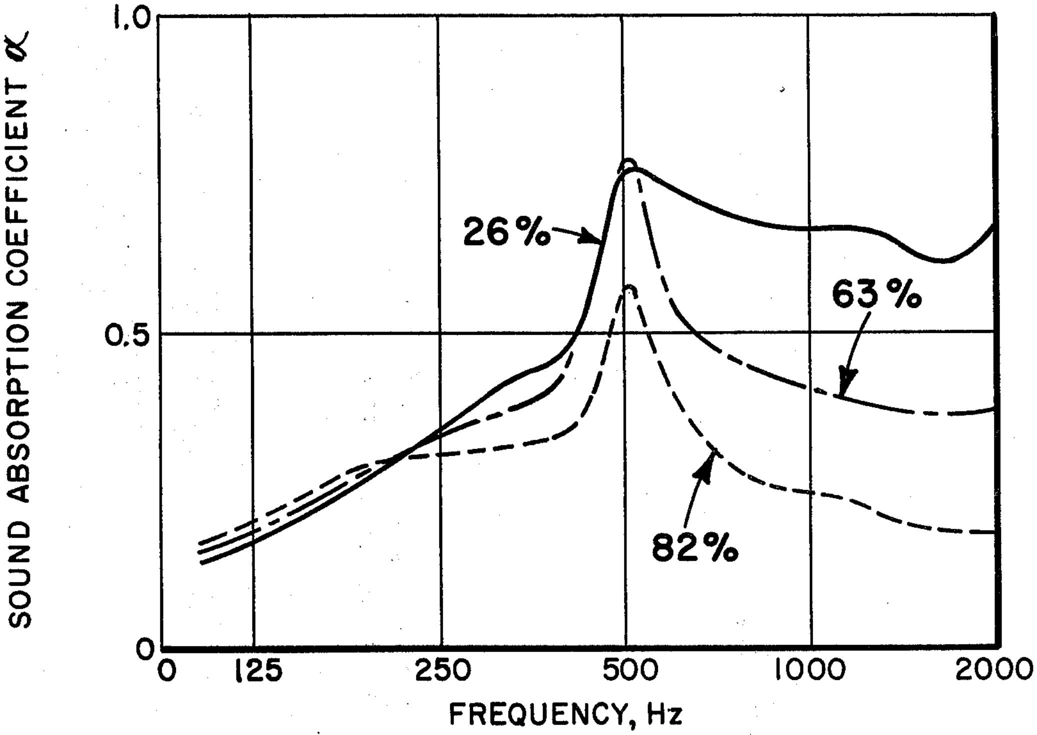

Thus, in FIG. 3 it is shown how the sound absorption curve is affected by a variation of the percentage of the surface of the carrying layer that is occupied by higher parts.

Figure 4:
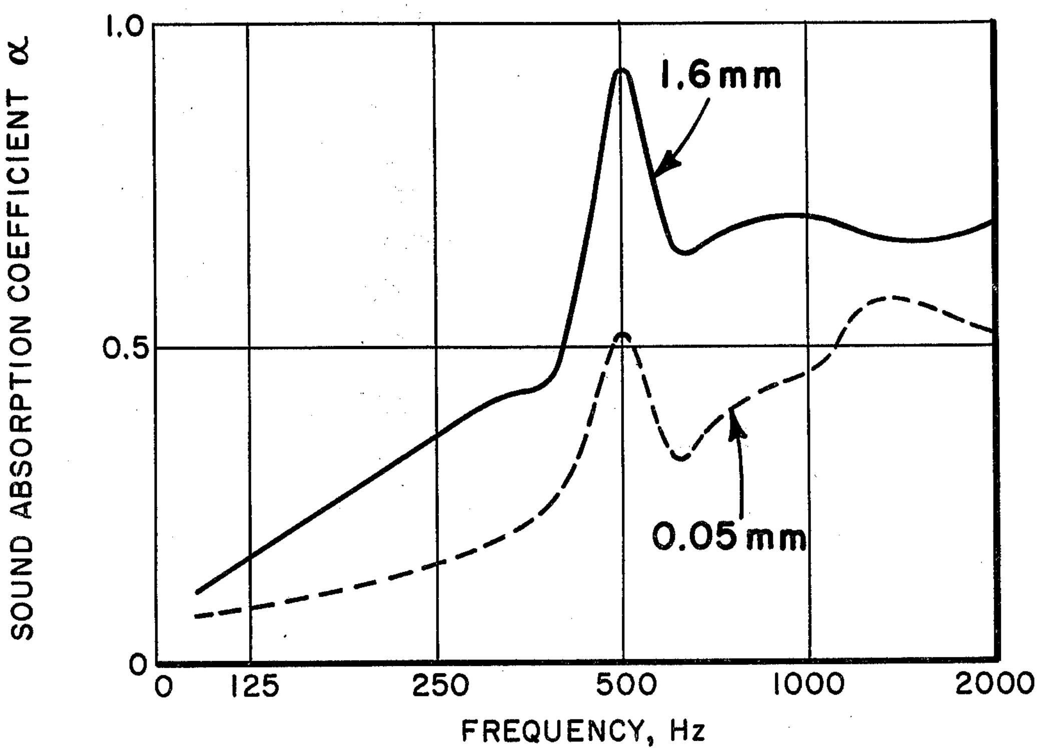

FIG. 4 elucidates how the sound absorption curve is affected by the distance between the membrane and the carrying layer.

In FIG. 5 it is shown how the sound absorption curve is affected by a variation of the air gap between the carrying layer and the sound reflecting surface.

FIG. 6 shows the influence of the size of the free surfaces of the membrane on the sound absorption curve.

FIG. 7 shows how the surface weight of the membrane affects the sound absorption curve.

Figure 9:
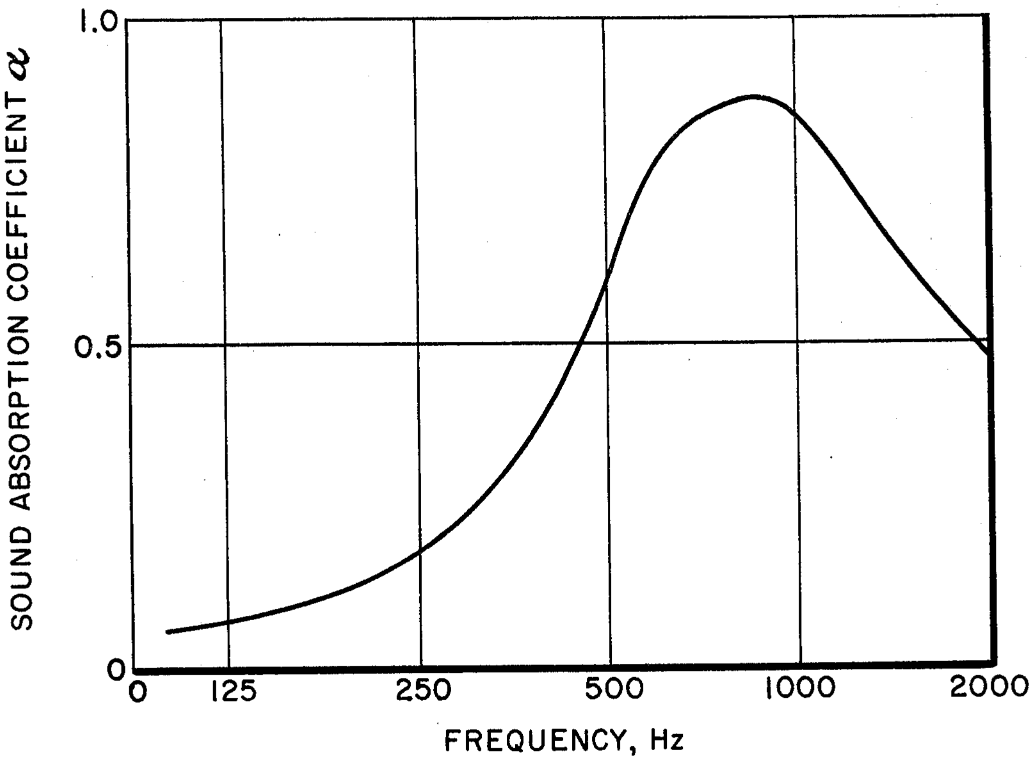

FIGS. 8 and 9 finally show the sound absorption curves obtained at the use of devices according to embodiment example 2 and 3 respectively below.

The device according to FIGS. 1 and 2 comprises a rigid, air permeable and self-supporting layer 1, having a flexible, air impermeable membrane 2 firmly attached thereto by gluing for example. One surface of the carrying layer is provided with a relief pattern achieved by pressing recesses in the form of squares therein. The membrane 2 lies on upper parts 3 of the relief pattern of the carrying layer. Thus, an air gap 4 is formed between the flexible membrane 2 and the lower parts 5 of the relief pattern. As clearly shown in FIG. 1 the device is mounted at a distance from a sound reflecting surface 6 by means of spacing supports 7 in such a way that an air gap 8 is formed between the back side of the carrying layer 1 and the sound reflecting surface 6.

EXAMPLE 1

On a 10 mm thick self-supporting board made of pressed, pulled rags and having an air flow resistance of about 2500 Pas/m, a layer made of cardboard forming a relief pattern was glued. The thickness of the layer was 1.6 mm and material was taken away from said layer in such a way that holes with an area of 14.5 $cm^2$ and in the form of circle sectors were formed. The remaining parts of the material occupied 26% of the total area of the pattern. On the remaining higher parts thus formed a 0.05 mm thick foil made of polyvinylchloride and having a surface weight of 70 $g/m^2$ was glued. The entire device was mounted at different distances from a sound reflecting surface whereupon the airborne sound absorption was measured. The results are presented in FIG. 5.

EXAMPLE 2

A device according to Example 1 was built up. However, the holes in the layer forming the relief pattern consisted of squares with an area of 9 $cm^2$ and the remaining sections occupied 54% of the total area of the pattern. This device was mounted 40 mm in front of a sound reflecting surface whereupon the airborne sound absorption was measured. The result is shown in FIG. 8.

EXAMPLE 3

A device according to Example 1 was built up. The rigid board was, however, made of an 8 mm thick pressed felt with an air flow resistance of about 880 Pas/m. This device was mounted at a distance of 27 mm in front of a sound reflecting surface whereupon the airborne sound absorption was measured. The result is presented in FIG. 9. While particular embodiments of the invention have been shown, it will be understood, of course, that the invention is not limited thereto since many modifications may be made, and it is, therefore, contemplated to cover by the appended claims any such modifications as fall within the true spirit and scope of the invention.

I claim:

1. An acoustical insulating device comprising a rigid, air permeable and self-supporting carrying layer and a flexible, air impermeable membrane applied thereto, said carrying layer having front and back sides, an air flow resistance of less than 10,000 Pas/m and a thickness of 1-60 mm, at least one surface of said carrying layer having a relief pattern comprising raised and lower parts, the depth of the relief pattern being 0.05 to 20 mm, said flexible membrane having a surface weight of less than 2 $kg/m^2$, means attaching said flexible membrane to said raised parts with an air gap of 0.05 to 20 mm between said flexible membrane and said lower parts, said device having support means for supporting said self-supporting carrying layer in spaced relation with a sound reflecting surface whereby an air gap of 5 to 100 mm between the back side of the carrying layer and said sound reflecting surface is provided for increasing the damping of acoustic energy transmitted by the carrying layer.

2. Device for absorption of airborne sound, including a rigid, air permeable and self-supporting carrying layer and a flexible, air impermeable membrane applied thereto, characterized in that the carrying layer has an air flow resistance of less than 10,000 Pas/m, that the layer has a thickness of 1-60 mm and that at least one surface of the layer is provided with a relief pattern, that a flexible membrane having a surface weight of less than 2 $kg/m^2$ is firmly attached to the carrying layer in such a way that the membrane is resting on the upper parts of the relief pattern of the carrying layer, the depth of the relief pattern being 0.05 to 20 mm, and that an air gap of the same depth is obtained between the flexible membrane and the lower parts of the relief pattern, and mounting means for mounting said self-supporting carrying layer at a distance from a sound reflecting surface, thereby obtaining an air gap of 5 to 100 mm between the back side of the carrying layer and the sound reflecting surface.

3. Device according to claim 2, characterized in that the carrying layer is made of pressed, pulled rags, board of mineral wool, sintered plastic balls, sintered metal balls or rigid plastic foam having substantially only open cells.

4. Device according to claim 2, characterized in that the relief pattern of the carrying layer has been brought about by pressing recesses therein which are square, circular or triangular shaped.

5. Device according to claim 2, characterized in that the upper parts of the relief pattern of the carrying layer has been brought about by applying at least one separate pattern forming layer on the surface of the carrying layer.

6. Device according to claim 6, characterized in that the pattern forming layer is made of a material different from that used for the carrying layer.

7. Device according to claim 2, characterized in that the highest parts of the relief pattern of the carrying layer constitute at most 80 percent of the total surface of the pattern.

8. Device according to claim 2, characterized in that the flexible membrane is attached by glueing to the carrying layer, the glue being applied to all or some of the upper parts of the relief pattern of the carrying layer.

9. Device according to claim 2, characterized in that the flexible membrane is polyurethane, polyethylene, polypropylene, polyester, polyamide, polycarbonate, polyvinylchloride, polyoxymethylene or polyvinylfluoride.

10. An acoustical insulating assembly comprising a rigid, air permeable and self-supporting carrying layer and a flexible, air impermeable membrane applied thereto, said carrying layer having front and back sides, an air flow resistance of less than 10,000 Pas/m and a thickness of 1–60 mm, at least one surface of said carrying layer having a relief pattern comprising raised and lower parts, the depth of the relief pattern being 0.05 to 20 mm, said flexible membrane having a surface weight of less than 2 $kg/m^2$, means attaching said flexible membrane to said raised parts with an air gap of 0.05 to 20 mm between said flexible membrane and said lower parts, and a reflecting surface spaced apart from said carrying layer whereby an air space of 5–100 mm between the back side of the carrying layer and said sound reflecting surface is provided for increasing the damping of acoustic energy transmitted by the carrying layer.

* * * * *

UNITED STATES PATENT AND TRADEMARK OFFICE

CERTIFICATE OF CORRECTION

PATENT NO. : 4,253,543

DATED : March 3, 1981

INVENTOR(S) : Bengt R. JOHANSSON

It is certified that error appears in the above-identified patent and that said Letters Patent are hereby corrected as shown below:

Column 5, Claim 6, line 15, change "6" to ---5---;

Column 6, Claim 9, line 4, between "is" and "polyurethane", insert ---made of---.

Signed and Sealed this

*Thirtieth* Day of *June 1981*

[SEAL]

*Attest:*

RENE D. TEGTMEYER

*Attesting Officer* *Acting Commissioner of Patents and Trademarks*